US006253539B1

(12) United States Patent
Farhangi et al.

(10) Patent No.: US 6,253,539 B1
(45) Date of Patent: Jul. 3, 2001

(54) CONVECTIVE AND TURBULENT SHEAR MIXING INJECTOR

(75) Inventors: Shahram Farhangi, Woodland Hills; James M. McKinnon, Moorpark; Steven C. Fisher, Simi Valley; James J. Fang, Chatsworth, all of CA (US)

(73) Assignee: Boeing North America Inc.

( * ) Notice: Subject to any disclaimer, the term of this patent is extended or adjusted under 35 U.S.C. 154(b) by 0 days.

(21) Appl. No.: 09/348,402

(22) Filed: Jul. 7, 1999

Related U.S. Application Data

(63) Continuation-in-part of application No. 08/719,041, filed on Sep. 24, 1996, now abandoned.

(51) Int. Cl.$^7$ ................................................ F02K 9/72
(52) U.S. Cl. ................................................ 60/211; 60/258
(58) Field of Search ........................... 60/211, 213, 214, 60/258; 239/418, 433

(56) References Cited

U.S. PATENT DOCUMENTS

| | | | |
|---|---|---|---|
| 1,514,976 | 11/1924 | Lewis | 29/157 |
| 3,048,915 | 8/1962 | Chute et al. | 29/157 |
| 3,242,670 | * 3/1966 | Buswell | 60/35.6 |
| 3,446,024 | * 5/1969 | Lewis et al. | 60/258 |
| 3,477,112 | 11/1969 | Yerkins | 29/157 |
| 3,479,819 | * 11/1969 | Bogue | 60/39.74 |
| 3,780,952 | * 12/1973 | Huang | 239/424.5 |
| 3,876,149 | 4/1975 | Futerko | 239/398 |
| 3,936,382 | 2/1976 | White | 210/198 R |
| 4,036,434 | 7/1977 | Anderson et al. | 239/8 |
| 4,716,639 | 1/1988 | Readman et al. | 29/157 |
| 4,722,181 | * 2/1988 | Yu | 60/39.06 |
| 4,992,025 | 2/1991 | Stroud et al. | 416/97 |
| 5,054,247 | 10/1991 | Rhoades et al. | 51/317 |
| 5,323,963 | 6/1994 | Ballu | 239/63 |
| 5,603,213 | * 2/1997 | Sion et al. | 60/258 |
| 5,660,039 | 8/1997 | Sion et al. | 60/258 |
| 5,673,858 | 10/1997 | Asakawa et al. | 239/553.3 |
| 5,714,113 | 2/1998 | Gitman et al. | 266/182 |
| 5,771,579 | * 6/1998 | Farhangi et al. | 29/890.01 |
| 5,983,626 | * 11/1999 | Stahn et al. | 60/258 |
| 6,116,020 | * 9/2000 | Cornelius et al. | 60/258 |

OTHER PUBLICATIONS

NASA Technical Manual Engine Data, J–2 Rocket Engine, R–3825–1, May 18, 1967, pp. 2–4.

* cited by examiner

Primary Examiner—Timothy S. Thorpe
Assistant Examiner—Ehud Gartenberg
(74) Attorney, Agent, or Firm—Stout, Uxa, Buyan & Mullins, LLP; Donald E. Stout

(57) ABSTRACT

A method for using an injector to combust a first fluid and a second fluid comprises a directing the first fluid step and a shrouding step. The directing step comprises directing the first fluid in a central coaxial flow generally perpendicularly through a first fluid passage that extends through an injector faceplate, and into a combustion chamber. In the shrouding step, a length of the central coaxial flow adjacent to the injector faceplate is shrouded with an outer coaxial flow. The shroud is formed by directing a portion of the second fluid through an annular/conical passage in the injector faceplate that surrounds the first fluid passage. The annular/conical passage is arranged such that the outer coaxial flow is directed radially inward and impinges on the central coaxial flow a distance after the central coaxial flow has exited the first fluid passage and after the outer coaxial flow has exited the annular/conical passage. Transpiration of either of the fluids through the injector faceplate permits combustion a higher temperatures. The combustion at higher temperatures permits the use of precombusted first and/or second fluids. Further, the shroud may be discontinuous to enable inter injection combustion of shrouded fluid by the shrouded fluid passing through gaps in the shroud. Temperature of 1300 degrees Fahrenheit and higher may be obtained with the method.

19 Claims, 8 Drawing Sheets

CONVECTIVE AND TURBULENT SHEAR MIXING INJECTOR

This application is a continuation-in-part of application Ser. No. 08/719,041 filed Sep. 24, 1996, abandoned and entitled Convective and Turbulent Shear Mixing Injector, the content of which is expressly incorporated herein by reference.

BACKGROUND OF THE INVENTION

1. Field of the Invention

This invention is related to an injector for injection of fluids into a mixing or combustion chamber utilizing combined convective (impinging) and turbulent shear processes for mixing with the ability to have a transpiration cooled face plate.

2. Description of the Related Art

It is known in the art to use injectors for combustion of reactant fluids. The injectors direct the two fluids into the combustion chamber in a controlled manner to achieve a desired release of energy. The three most functional concerns for designing a rocket injector are:

1) hardware heat transfer;
2) combustion performance; and
3) combustion stability.

The performance of the rocket injectors is typically dictated by the propellant mixing and, for a liquid propellant engine, the propellant vaporization. The vaporization process in turn is a strong function of liquid atomization. Both the mixing and atomization of propellants are controlled by the design of the injector.

While impinging jet design in the prior art has resulted in adequate atomization and mixing of the propellants, overheating in the combustion chamber and injector is an ongoing concern, especially for a high performing injector. The overheating may be caused by hot gas recirculation over the injector plate and improper mixing or mixture ratio of the propellants in the wall region. A top choice for impinging jet injector design is unlike jet impingement because of its rapid and efficient mixing process. The problem is its tendency for combustion instability.

It is also known that the injectors are coaxial, such as disclosed in U.S. Pat. No. 5,771,576 to Farhang et al. entitled "Convective and Shear Mixing Injector Assembly" and U.S. Pat. No. 5,660,039 to Sion et al. entitled "Injection System and an Associated Tricoaxial Element", both of which are incorporated herein in their entireties. The injectors may be designed to induce swirling in either fluid. A coaxial design without induced swirling, a shear coaxial injector, improves the over heating problem by having the outer coaxial propellant completely shrouding the central coaxial propellant. The shear coaxial injector also avoids the combustion instability by having a more gradual mixing and combustion process. A downside to the shear coaxial injector design in the slow mixing process that solely relies on the interface shearing effect. Further, the so-called reactive stream separation phenomenon may occur, resulting in poor mixing efficiency. Coaxial injectors with swirl flow design have improved mixing of the propellants, but introduce the risk of overheating of face and wall. Another limitation of the injectors of the prior art is the absence of an inter-element mixing effect, resulting in lower mixing efficiency.

The prior art injectors have been of the convective (impinging) type and/or of the turbulent shear mixing type. Both have advantages and disadvantages. The advantages for convective type injectors (conventional impinging type) include high mixing efficiency, ease of controlling the mixing process by pattern and orientation and lower cost. The disadvantages for convective type injector are high injector and near injector chamber heat flux, possibility of chamber wall oxygen compatibility issues (streaking), difficulty with injector spacing and packaging. It also becomes very difficult and complex to provide transpiration cooling for the face plate near the oxidizer injection for impinging type injectors. The advantages of conventional turbulent shear mixing type injectors (like coaxial) are good flame holding and lower injector and near injector chamber wall heating. The disadvantages for turbulent shear mixing type are lower mixing rate, higher injector pressure drop, less controllability in mixing rate, difficult to cool area near the oxidizer tube tip, limited number of parameters for design and possibility of oxidizer tube vibration and wandering without complex face nut design.

Referring now to Prior Art Figure 1a, a prior art injector 100a for a conventional impinging type injector system comprises a solid face plate 1a through which extends fuel passages 2a and oxidizer passages 3a. The fuel passages 2a extend between a fuel manifold 12a and a combustion chamber 50a. The fuel manifold 12a is depicted above the solid face plate 1a and the combustion chamber 50a is depicted below the sold face plate. The shown oxidizer passage 3a extends between an oxidizer manifold 13a and the combustion chamber 50a, with the oxidizer manifold depicted above the solid face plate 1a and extending between the fuel manifolds 12a.

The oxidizer passage 3a extends through the solid face plate 1a to direct a oxidizer flow 102a perpendicularly into the combustion chamber 50a. The fuel passages 2a are at an angle through solid face plate 1a and are arranged to direct fuel flows 104a to impinge upon the respective oxidizer flow 102a. Other prior art designs of coaxial and shower head injectors direct perpendicularly the fuel flow 104a into the combustion chamber 50a.

A disadvantage of the prior art injector design 100a is the high temperature incurred in the combustion chamber 50a at the solid face plate 1a. Transpiration cooling has been used in non-analogous applications to prevent part overheating. In the prior art for impinging injectors, transpiration of the fuel through the solid-face plate 1a is not directly feasible. Further, if the faceplate was porous or if transpiration holes were manufactured into the solid face plate 1a, the fuel manifold 12a is only in contact with a portion of the face plate, resulting in uneven transpiration and hot spots on the face plate, since oxidizer is not suitable for transpiration cooling of injectors.

As the prior art does not disclose a suitable cooling solutions, i.e. transpiration cooling through the face plate, the use of fuels and oxidizers of elevated temperatures is also not disclosed in direct nor analogous prior art. It is known in non-analogous prior art situations to precombust fuel and oxidizer for other purposes, such as providing rotational power to an upstream turbine, prior to complete combustion of the fluids. However, limitations in the ability to withstand elevated temperatures in the combustion chamber has restricted the prior art in the field of impinging injector design to lower temperature, non-precombusted propellant fluids.

SUMMARY OF THE INVENTION

The claimed invention addresses limitations of the impinging injector design prior art with a generally coaxial arrangement is used for its good heat transfer and combustion stability characteristics. The flow of an outer fluid is angled towards the flow of the center fluid as the fluids exit the injector. The angled impingement of the outer fluid flow onto the center fluid flow improves the mixing efficiency beyond a typical shear coax design.

In a aspect of the invention, a method of combusting a first fluid and a second fluid comprises a directing the first fluid step and a shrouding step. The directing step comprises directing the first fluid in a central coaxial flow generally perpendicularly through a first fluid passage that extends through an injector faceplate, and into a combustion chamber. In the shrouding step, a length of the central coaxial flow adjacent to the injector faceplate is shrouded with an outer coaxial flow. The shroud is formed by directing a portion of the second fluid through an annular/conical passage in the injector faceplate that surrounds the first fluid passage. The annular/conical passage is arranged such that the outer coaxial flow is directed radially inward and impinges on the central coaxial flow a distance after the central coaxial flow has exited the first fluid passage and after the outer coaxial flow has exited the annular/conical passage.

In a further aspect of the invention, there is a step of cooling a combustion chamber side of the injector faceplate through transpiration of another portion of the second fluid through the injector faceplate. The transpiration may occur through the second fluid portion flowing through a porous faceplate. The transpiration may also occur through transpiration passages that extend between a second fluid plenum side of the injector faceplate and the injector faceplate combustion chamber side.

In further aspects of the invention, there is a step of precombusting the first fluid prior to the directing the first fluid step, a step of precombusting the second fluid prior to the shrouding step, or a combination of the precombusting steps.

In a further aspect of the invention, there is a step of preheating either the first or second fluid prior the first or second fluid entering its respective passage through the injector faceplate.

In a further aspect of the invention, the shrouding step further comprises the step of forming a laterally discontinuous shroud. In a still further aspect of the invention, the step of forming the laterally discontinuous shroud further comprises a step of directing the second fluid through a discontinuous annular/conical passage.

In a further aspect of the invention, the step of directing the first fluid further comprises a step of directing the first fluid in a plurality of central coaxial flows and the step of shrouding further comprises a step of shrouding lengths of the plurality of coaxial central flows with a plurality of outer coaxial flows, respectively. In a still further aspect of the invention, there is a step of promoting inter-coaxial flow mixing by forming longitudinal gaps in the plurality of shrouds such that combustion products and a portion of the first fluid in the plurality of coaxial flows pass through the shroud longitudinal gaps and the first fluid portion reacts with adjacent shrouds. In an additional aspect of the invention, the step of forming longitudinal gaps in the plurality of shrouds further comprises a step of directing the second fluid through a plurality of discontinuous annular/conical passages.

In a further aspect of the invention, there are the steps of cooling a combustion chamber side of the injector faceplate through transpiration of another portion of the second fluid through the injector faceplate and forming longitudinal gaps in the plurality of shrouds such that combustion products and a portion of the first fluid in the plurality of coaxial flows pass through the shroud longitudinal gaps and the first fluid portion reacts with the another portion of the second fluid after the another portion of the second fluid transpires through the injector faceplate. In a still further aspect of the invention, the step of forming longitudinal gaps in the plurality of shrouds further comprises a step of directing the second fluid through a plurality of discontinuous annular/conical passages.

An aspect of the invention is a method of combusting first and second propellant fluids comprising steps of preheating, providing an injector, and a directing step. In the preheating step, the first or the second propellant fluid to at least 500 degrees Fahrenheit. The providing injector comprises a porous faceplate, an oxidizer tube array structure, and a plurality of annular/conical passages. The porous faceplate disposed between a combustion chamber and a second propellant fluid plenum. The oxidizer tube array structure has oxidizer passages that extend from a first propellant fluid manifold, through the second propellant fluid plenum, through the porous face plate, and into the combustion chamber. The plurality of annular/conical passages extend through the porous faceplate and about the oxidizer passages. The annular/conical passage is arranged such that a flow of the second propellant fluid from the second fluid plenum and through the annular/conical passages is directed radially inward and impinges on a flow of the first propellent fluid from the first propellant fluid manifold a distance after the first propellant fluid flows have exited the first fluid passages and after the second propellant fluid flows have exited the annular/conical passages. The directing step comprises directing the first propellant fluid into the first propellant fluid manifold and directing the second propellant fluid into the second propellant fluid plenum, wherein a portion of the second propellant fluid transpires from the second propellant fluid plenum and through the porous faceplate.

In a further aspect of the invention, the oxidizer passages comprise oxidizer tubes that are integrally formed with the oxidizer tube array structure. Further, the porous face plate has receiving apertures into which the oxidizer tubes are secured.

Other aspects of the invention may preheat the first or second propellant to at least 1000 degrees Fahrenheit or at least 1300 degrees Fahrenheit.

As a result, the injector design as described by this invention is capable of delivering a combustion process that has a high combustion performance, minimum hardware heat transfer problem, stable engine operation, and low manufacturing cost.

DETAILED DESCRIPTION OF THE PREFERRED EMBODIMENT

Figure 1:
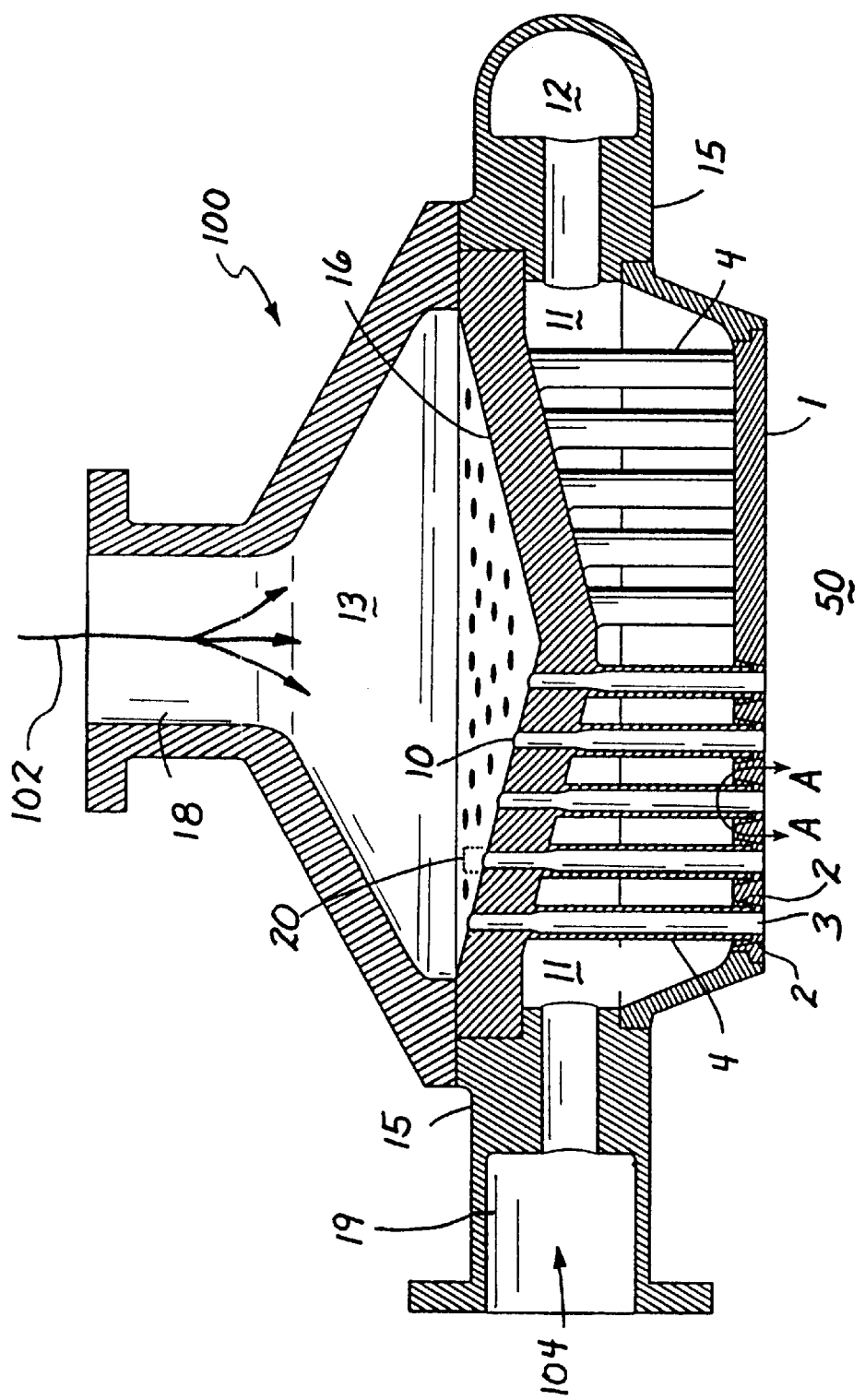
FIG. 1 is a cross-section of the injector body and manifold.

Referring now to FIG. 1, an injector 100 is comprised of an oxidizer manifold 13, a fuel plenum 11, and a face plate 1, with oxidizer tubes 4 extending from the fuel plenum 11 and through the face plate 1 to a combustion chamber 50. The arrangement of the injector 100 is disclosed in U.S. Pat. No. 5,771,579 to Farhangi et al. entitled "Convective and Shear Mixing Injector Assembly" and is herein incorporated in its entireties. The oxidizer tubes 4, form an oxidizer tube array structure 16.

Figure 2A:
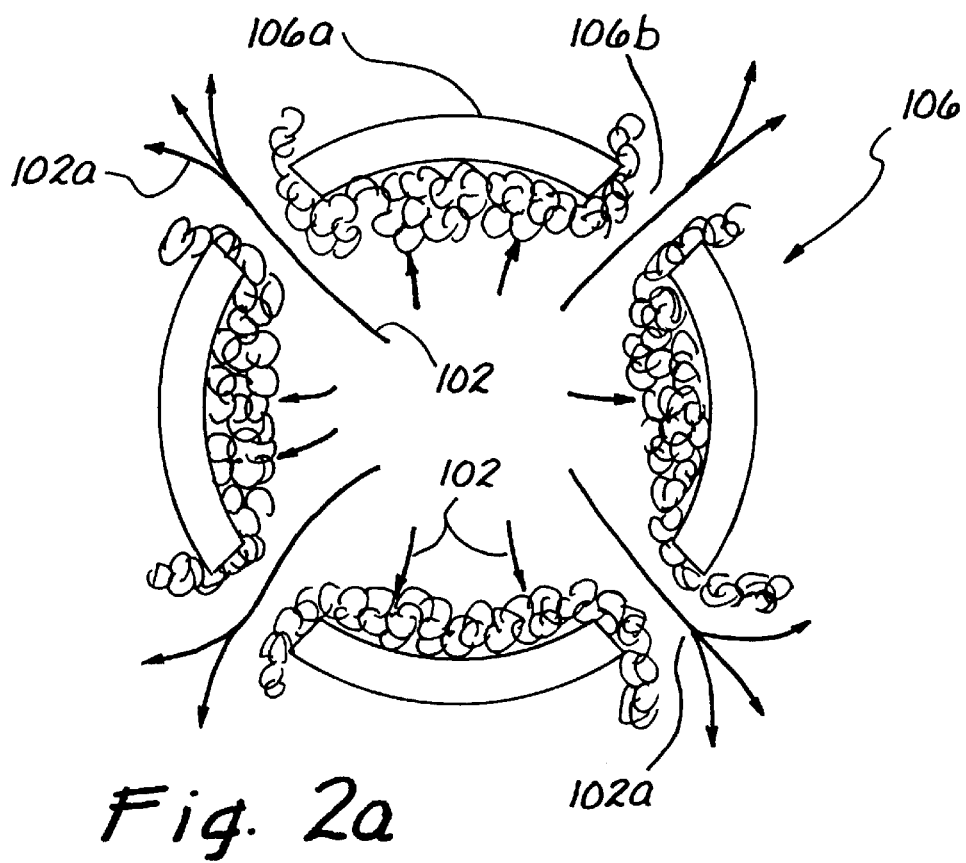
FIG. 2a is a cross-section of a laterally discontinuous shroud in a combustion chamber as generated by the embodiment of the invention shown in FIG. 2.
Figure 1A:
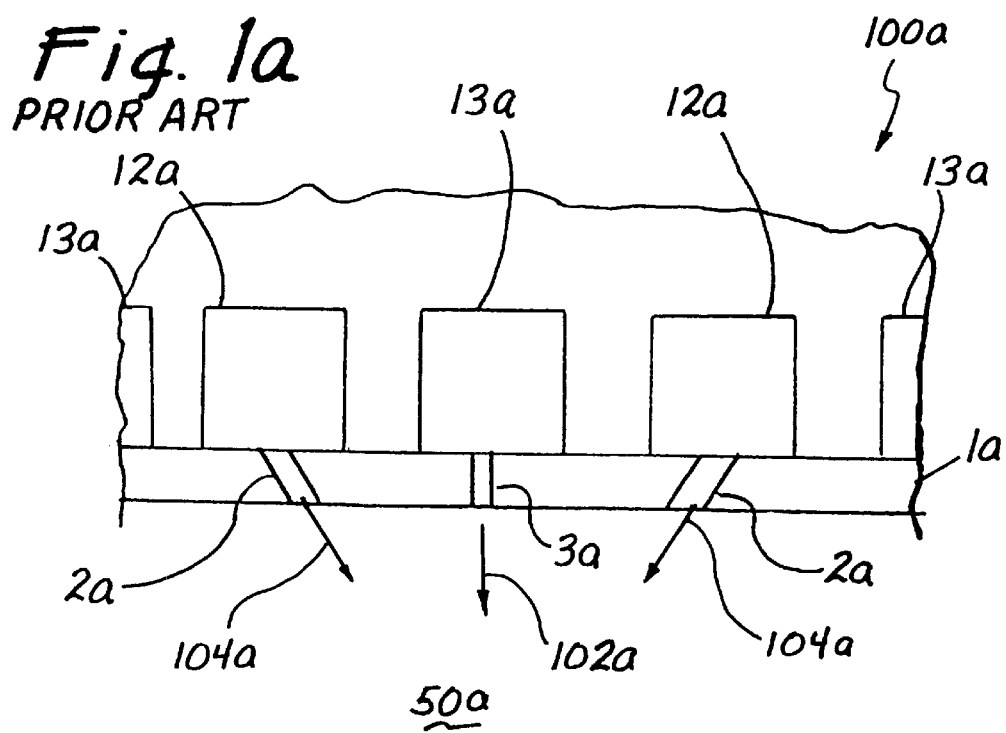
FIG. 1a is a representation of prior art injector manifolds.
Figure 2:
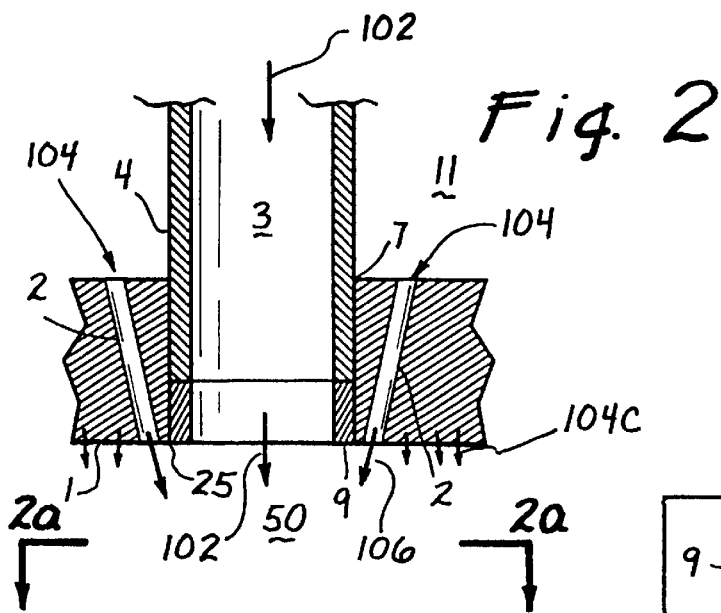
FIG. 2 is a cross-section of one injector element and the surrounding face plate taken from section A—A of FIG. 1.

Referring now to FIG. 2 as well, an oxidizer flow 102 enters the oxidizer manifold 13 through an oxidizer inlet 18. FIG. 1 shows the oxidizer inlet 18 at the top and axially located. Other embodiments of the invention may have other suitable arrangements for the oxidizer inlet/manifold system, including multiple inlets. The oxidizer flow 102 is then directed through the tubes 4 of the oxidizer tube array structure 16, and into the combustion chamber 50. A fuel flow 104 enters a fuel manifold 12 through an inlet 19. The fuel manifold 12 directs the fuel flow 104 into the fuel plenum 11 extending between the porous face plate 1 and the oxidizer manifold 13. A portion of the fuel flow 104 is directed through fuel passages 2 extending through the face plate 1 and into the combustion chamber 50.

In an embodiment of the invention, the face plate 1 is porous to enable fuel 104 to transpire therethrough as transpiration cooling fuel flow 104c and into the combustion chamber 50. The resulting transpiration cooling from fuel flow 104c protects the faceplate 1 from elevated temperatures. In an embodiment of the invention, fuels and oxidizers of elevated temperatures may be combusted, i.e. precombusted fuels and oxidizers. The fuel may be precombusted with a less than stoichiometric amount of oxidizer. The oxidizer may be precombusted with a less than stoichiometric amount of fuel. The precombustion of either or both of the fuel and oxidizer to provided rotational power to turbine upstream of the injector 100. The fuel and oxidizer may be preheated for or by any other suitable means, such as energy recovery, increase combustion efficiency, cooling of other equipment, etc. Embodiments of the invention combust propellant that is 500 degrees Fahrenheit or greater, 1000 degrees Fahrenheit or greater, and 1300 degrees Fahrenheit or greater.

The effectiveness of the transpiration cooling from the transpiration cooling fuel flow 104c is increased with the maximization of the percent of the face plate 1 that is porous. The face plate 1 is comprised of porous material and oxidizer tube apertures 25. The oxidizer tube apertures receive the oxidizer tubes as described below. In some embodiments of the invention, nuts (not shown) and other components may be used to secure the tubes 4 in place. Some of the nuts effectively reduce the percentage of the face plate 1 through which the fuel flow 104c may transpire, resulting in reduced cooling by transpiration. Preferred embodiments of the invention include methods and means of placing and/or securing the tubes 4 in the apertures 25 that maximize the porous component of the face plate 1, as describe below.

Different embodiment of the invention may have different arrangements and constructions of the passages 2 and 3. Referring specifically to FIG. 2, an enlarged cross section view taken from line A—A of FIG. 1 shows the oxidizer tube 4 and fuel passage 2 passing through face plate 1. The oxidizer tuber 4 has a tip 9 can be either an integral part of the oxidizer tube 4 or can be made of different material (such as one that is highly conductive and oxidizer resistant for durability) from oxidizer tube 4 as a separate piece. The oxidizer tube tip 9 can also be an integral part of the face plate 1.

The oxidizer tube 4 and face plate 1 of the embodiment shown in FIG. 2 could be held together by a simple brazed joint 7 or other types of bonding. The brazed joint 7 holds the oxidizer tube 4 steady therefore providing a fixed end to eliminate oxidizer tube vibration and wandering while reducing the number of parts and eliminating the need for a complex component such as a face nut. This will also allow close packing of injector elements and at the same time maximizes transpiration cooled face plate surface area.

In the embodiment of the invention shown in FIGS. 1–5, the fuel passages 2 are four slots around the oxidizer tube 4 and oxidizer passage 3 in face plate 1. The arrangement of the fuel passages 2 around the oxidizer passage 3 effects the mixing of the fuel with the oxidizer and the resulting heat release pattern (combustion process) therefore the heat flux to the face plate 1. Here the fuel flow 104 is angled inward toward the oxidizer flow 102 for a combined convective (forced) mixing and shear mixing for high performance. The angling of the fuel flow results in a shroud 106 of fuel forming about the oxidizer flow 102.

Figure 3:
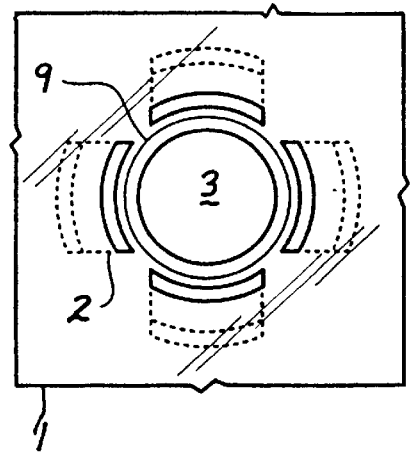
FIG. 3 is a bottom view of one injector element and the surrounding face plate.

FIG. 3 shows the bottom view of FIG. 2 revealing the fuel coming through four slotted fuel passages 2 (they could be of any geometrical shapes) angled towards the oxidizer exiting oxidizer passage 3 and impinging the oxidizer to enhance and control the mixing. The impingement angle of each fuel passage 2 can be individually tailored to provide the desired mixing. The geometry of each (or a group of) injector element can also be tailored (shape, size, angle, etc.). To vary and control propellant flow rates and mixture ratio (ratio of oxidizer flow to fuel flow) precisely with the drilled oxidizer and fuel passages. This flexibility will provide good wall heat transfer and erosion control capability.

Referring now to FIG. 2a, the slotted fuel passages 2 result in a laterally discontinuous shroud 106a about the oxidizer flow 102. The laterally discontinuous shroud 106a defines longitudinally extending shroud gaps 106b through which may escape combustion products 108 generated between the shroud 106 and the oxidizer flow 102. Further, oxidizer 102a may also escape from the oxidizer flow 102 and through the shroud gaps 106b. The escaping of the oxidizer 102a through the shroud gaps 106b results in more inter-injector mixing and combustion with an increase in combustion efficiency.

In FIGS. 2 and 3, the oxidizer tube 4 is brazed to face plate 1 and the fuel passages 2 are made by laser drilling, electrical discharge machining, or otherwise drilling through face plate 1.

Figure 4:
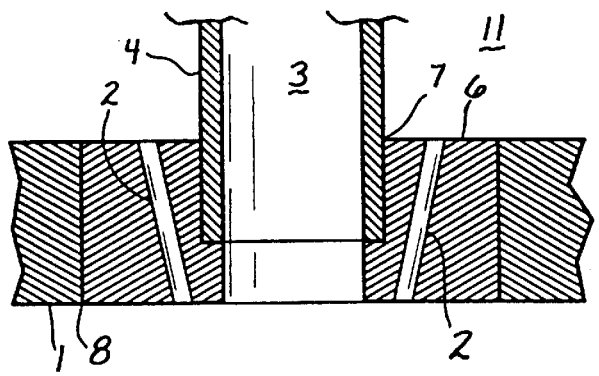
FIG. 4 is a cross-section of one injector element with a fuel passage ring and the surrounding plate.
Figure 5:
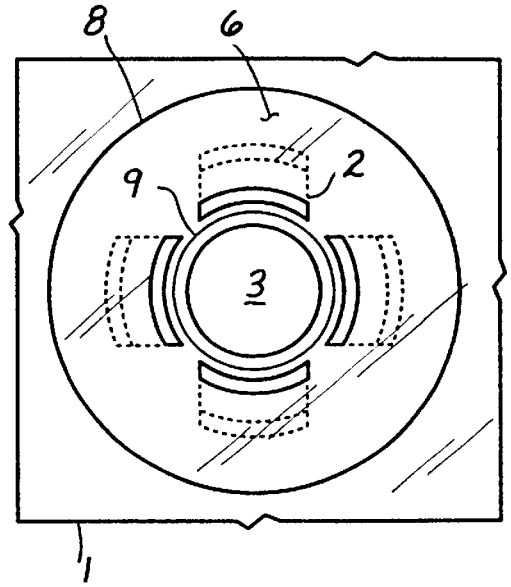
FIG. 5 is a bottom view of the embodiment of the injector element of FIG. 4 and the surrounding face plate.
Figure 6:
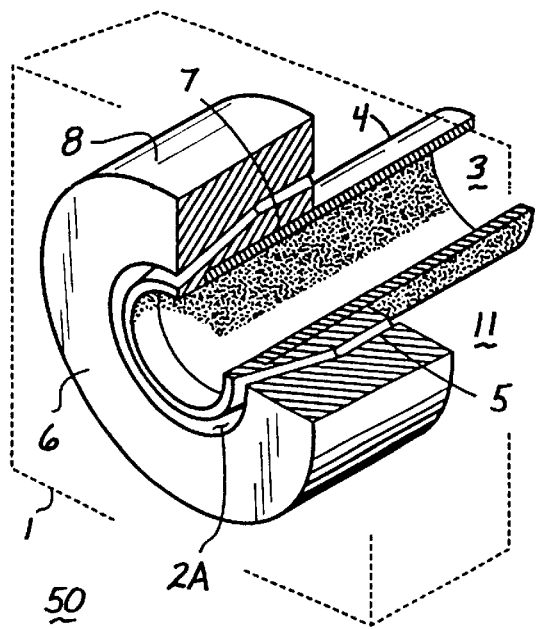
FIG. 6 is a bottom cut away perspective view of a second embodiment of the injector with a section of the face plate.
Figure 7:
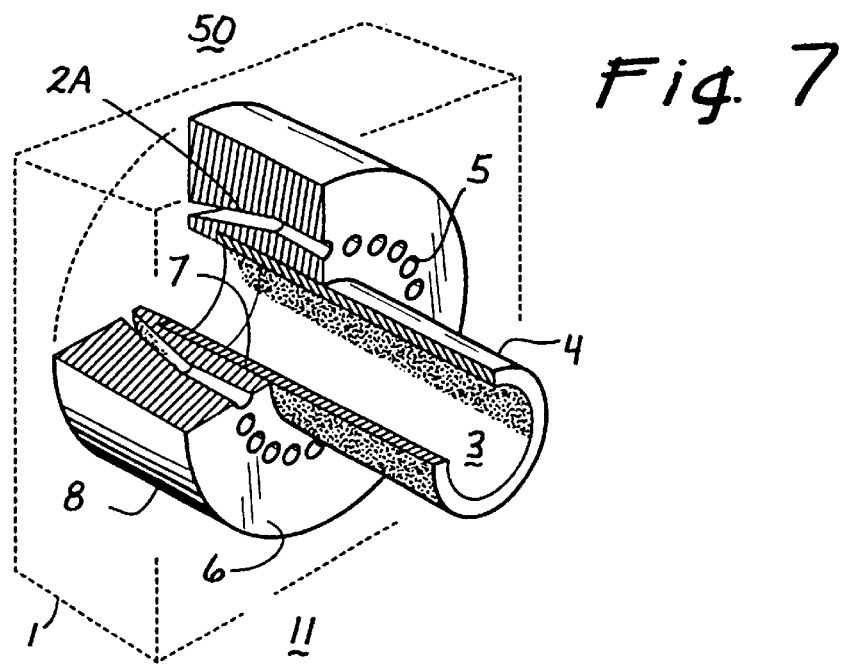
FIG. 7 is a top cut away perspective view of a second embodiment of the injector with a section of the face plate.

FIGS. 4 and 5 show a variation on the embodiment shown in FIGS. 2 and 3 wherein, the fuel passages 2 are made in a fuel passage ring 6 which is inserted into the face plate 1 and bonded to it by brazing at joint 8. The oxidizer tube 4 can alternatively be an integral part of fuel passage ring 6 or bonded to the oxidizer tube at braze joint 7.

The materials used in the fuel passage ring 6, the oxidizer tube 4 and the face plate 1 may be different. The materials used for the fuel passage ring 6 could be highly heat conductive, if required. The oxidizer tube tip 9 can be an integral part of the fuel passage ring 6. The fuel passage ring 6 may or may not be porous to enable transpiration cooling.

FIGS. 6–10 show yet another embodiment of the invention. The fuel in fuel plenum 11 is fed through circular (or any other shape) fuel feed passages 5, which feeds continuous annular/conical fuel passage 2A which delivers fuel at an angle to the oxidizer emanating from oxidizer tube 4. Alternatively, the fuel feed passages 5 may continue through the fuel passage ring 6 as circles (or other shapes as in FIGS. 2 and 3) rather than converge to an annular/conical ring 2A as shown. The use of continuous annular/conical fuel passages 2A instead of slots 106 is to eliminate the surface (land) between the fuel slots of FIGS. 3 and 5 to provide yet another design flexibility to improve mixing and to control flame holding zone.

In the embodiment shown in FIGS. 6–10, the oxidizer tube 4 is brazed to the fuel passage ring 6 along braze joint 7. The fuel passage ring 6 is brazed to the face plate 1 along braze joint 8. The fuel feed passages as well as fuel passages may also be made in the face plate (similar to embodiment shown in FIGS. 2 and 3) while the oxidizer tubes 4 are bonded to the face plate 1 obviating the fuel passage ring component.

Figure 8:
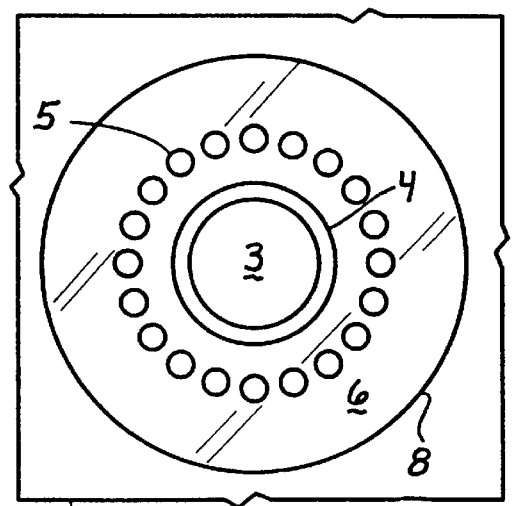
FIG. 8 is a top view of the second embodiment of an injector element and the surrounding face plate.
Figure 9:
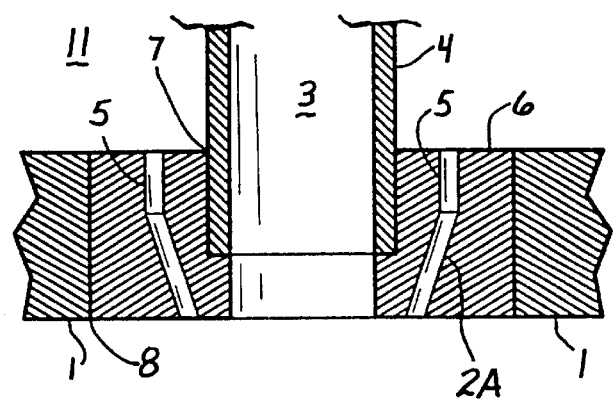
FIG. 9 is a cross-section of the second embodiment of the injector element and the surrounding face plate.
Figure 10:
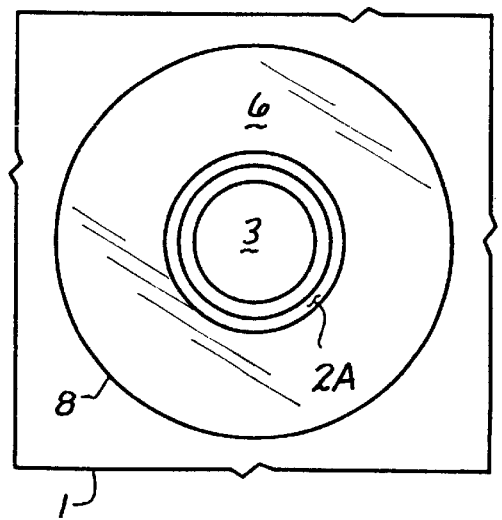
FIG. 10 is a bottom view of the second embodiment of the injector element and the surrounding face plate.
Figure 11:
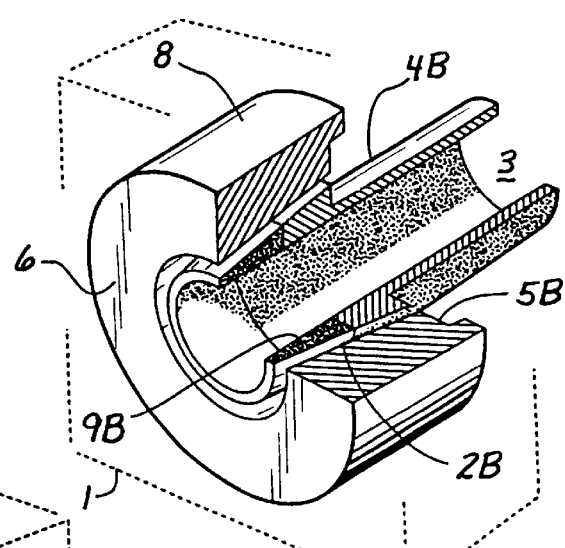
FIG. 11 is a bottom cut away perspective view of a third embodiment of the injector with a portion of the face plate.
Figure 12:
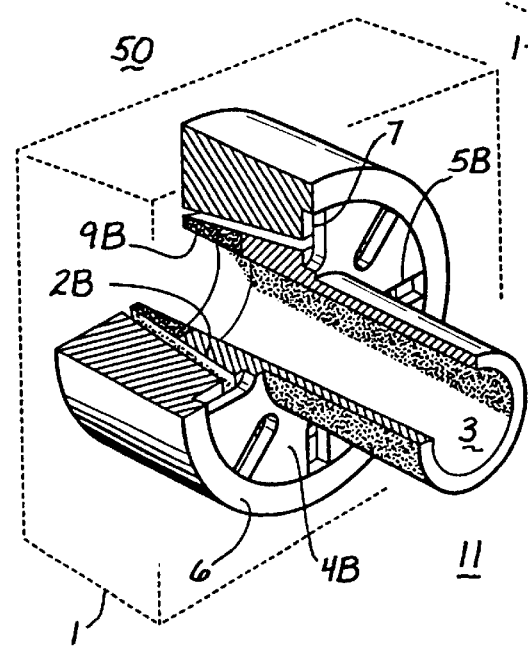
FIG. 12 is a top cut away perspective view of the third embodiment of the injector with a portion of the face plate.
Figure 13:
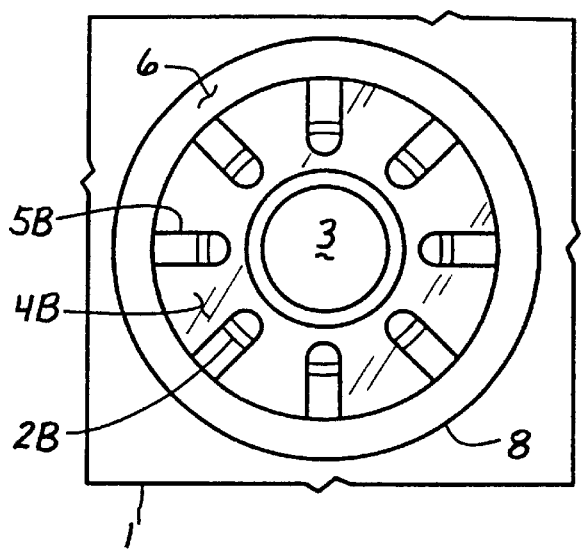
FIG. 13 is a top view of the third embodiment of an injector element and the surrounding face plate.

In the embodiment shown in FIGS. 11–13, instead of having fuel feed passages 5 as a plurality of passages as in FIG. 8, here the fuel feed passages SB are slots (they can be of any shape) which feed a conical ring fuel passage 2B, bringing fuel into combustion chamber 50. In this embodiment the oxidizer tube 4 is an integral part of fuel passage ring 6. The oxidizer tube tip 9B may be a separate piece from the oxidizer tube 4B and can be made from different material for either strength or for beat conduction.

Figure 14:
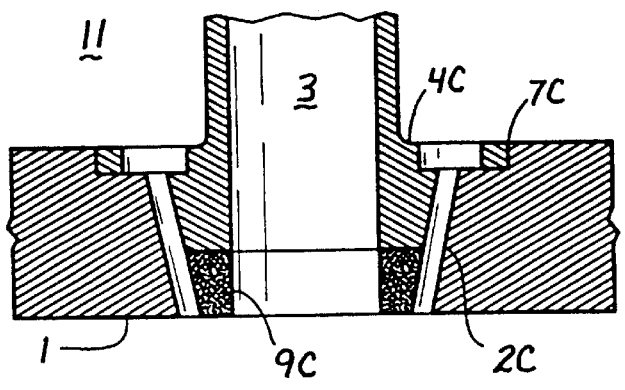
FIG. 14 is a cross-section of a fourth embodiment of the injector element and the surrounding face plate.
Figure 15:
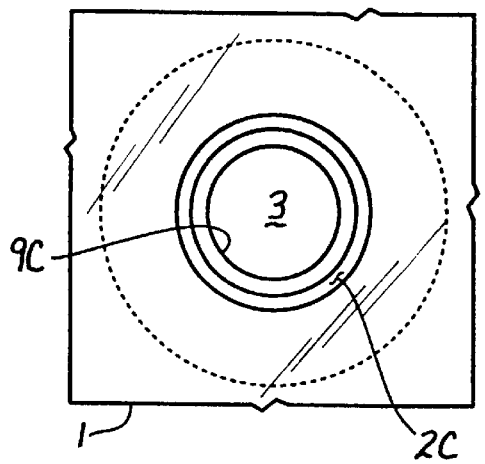
FIG. 15 is a bottom view of the fourth embodiment of the injector element and the surrounding face plate.
Figure 16:
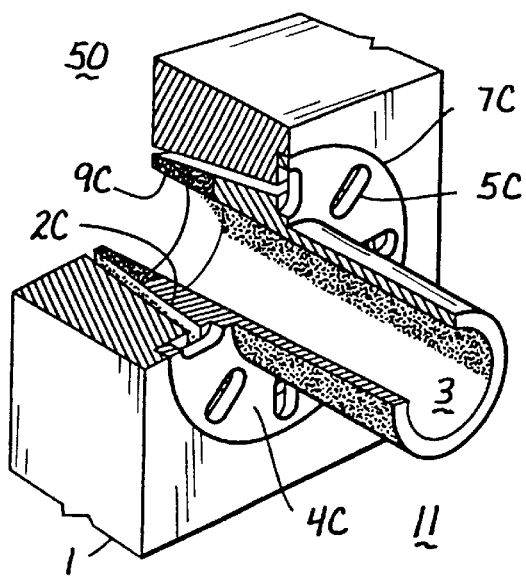
FIG. 16 is a top cut away perspective view of a fourth embodiment of the injector element and the surrounding face plate.

In the embodiment shown in FIGS. 14–16 the fuel feed passages 2C are made in the body of oxidizer tube 4C, however the depth of braze joint 7C of the oxidizer tube is only a fraction of the thickness of face plate 1. In this embodiment the fuel passages are formed by shaping the oxidizer tube 4C outer surface (and/or the oxidizer tube tip 9C) to desired configuration to represent the geometry of inner wall of fuel passages 2C. The oxidizer tube aperture in face plate 1 may be shaped to comprise the outer wall of the fuel passages. The oxidizer tubes 4C are bonded, at joint 7C, to the face plate 1. In an alternative design a fuel passage ring 6C may be used.

Figure 19:
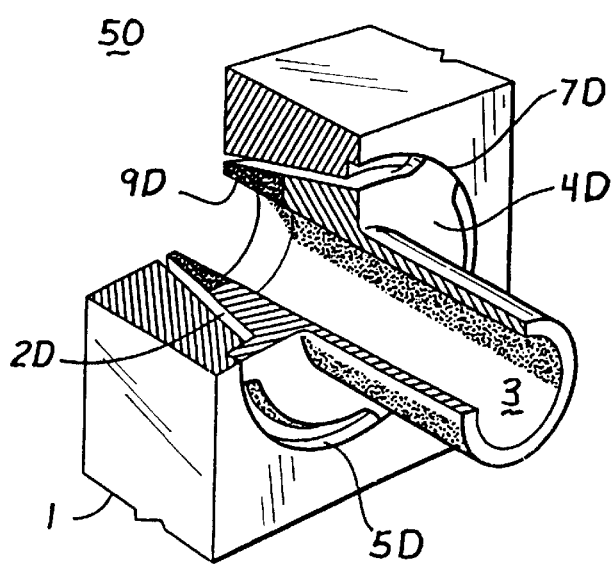
FIG. 19 is a top cut away perspective view of a fifth embodiment of the injector element and the surrounding face plate.
Figure 17:
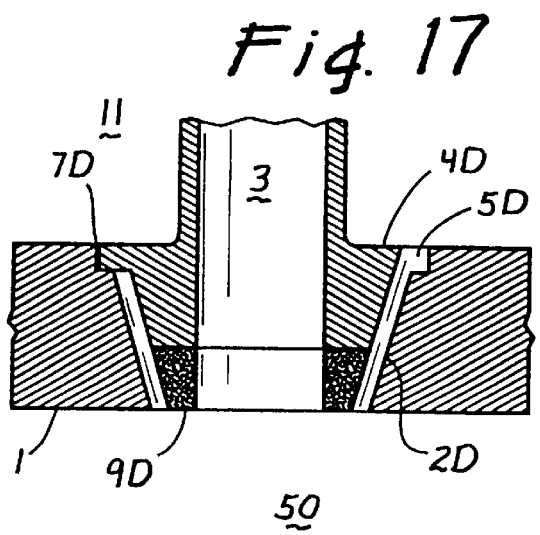
FIG. 17 is a cross-section of the fifth embodiment of the injector element and the surrounding face plate.
Figure 18:
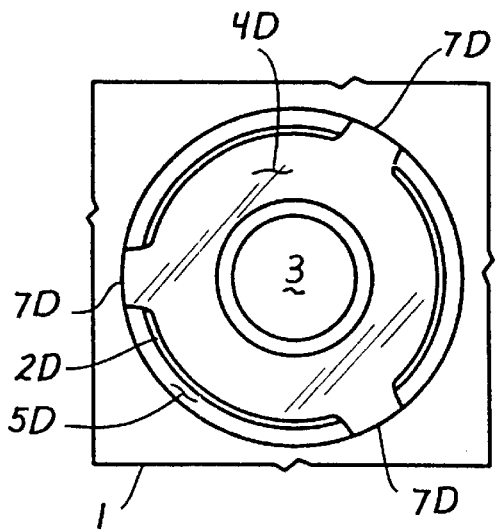
FIG. 18 is a top cut away perspective view of a fifth embodiment of the injector with a section of the face plate.

In the embodiment shown in FIGS. 17–19 fuel feed passages 2D are formed between the oxidizer tube 4D and the face plate 1. This is accomplished by shaping the outer surface of oxidizer tube 4D and oxidizer tube aperture surface to comprise the inner and outer wall of fuel feed passages 5D and fuel passages 2D. In this design the joint 7D could be used to center and hold the oxidizer tubes 4D in place and not bonded to the face plate 1 or to the fuel passages SD.

A swirl cap 20 (as seen in FIG. 1) may be optionally placed on the top of the oxidizer orifice 10 in any of the embodiments presented. The swirl cap 20 is used to generate rotation of the oxidizer coming through the oxidizer tube 4 such that when the oxidizer exits oxidizer tube 4 it is rotating thus promoting mixing of the oxidizer and fuel (or any fluids) in the combustion chamber 50.

Obviously, many modifications and variations of the present invention are possible in light of the above teachings. For example, any suitable combination of two or more propellants may be used; the fuel may be the center fluid flow and the oxidizer may be the outer fluid flow; the oxidizer may be the transpiration fluid; etc. It is therefore to be understood that, within the scope of the appended claims, the invention may be practiced otherwise than as specifically described.

What is claimed is:

1. A method of combusting a first fluid and a second fluid comprising the steps of:

directing the first fluid in a central coaxial flow generally perpendicularly through a first fluid passage that extends through an injector faceplate, and into a combustion chamber;

shrouding a length of the central coaxial flow adjacent to the injector faceplate with an outer coaxial flow, the shroud being formed by directing a portion of the second fluid through an annular/conical passage in the injector faceplate that surrounds the first fluid passage, the annular/conical passage being arranged such that the outer coaxial flow is directed radially inward and impinges on the central coaxial flow a distance after the central coaxial flow has exited the first fluid passage and after the outer coaxial flow has exited the annular/conical passage.

2. The method of claim 1, further comprising a step of cooling a combustion chamber side of the injector faceplate through transpiration of another portion of the second fluid through the injector faceplate.

3. The method of claim 2, wherein the injector faceplate is porous.

4. The method of claim 2, wherein the injector faceplate comprises transpiration passages between a second fluid plenum side of the injector faceplate and the injector faceplate combustion chamber side.

5. The method of claim 2, further comprising a step of precombusting the first fluid prior to the directing the first fluid step.

6. The method of claim 2, further comprising a step of precombusting the second fluid prior to the shrouding step.

7. The method of claim 6, further comprising a step of precombusting the first fluid prior to the directing the first fluid step.

8. The method of claim 2, further comprising a step of preheating either the first or second fluid prior the first or second fluid entering its respective passage through the injector faceplate.

9. The method of claim 1, wherein the shrouding step further comprises the step of forming a laterally discontinuous shroud.

10. The method of claim 9, wherein the step of forming the laterally discontinuous shroud further comprises a step of directing the second fluid through a discontinuous annular/conical passage.

11. The method of claim 1, wherein:

the step of directing the first fluid further comprises a step of directing the first fluid in a plurality of central coaxial flows; and the step of shrouding further comprises a step of shrouding lengths of the plurality of coaxial central flows with a plurality of outer coaxial flows, respectively.

12. The method of claim 11, further comprising a step of promoting inter-coaxial flow mixing by forming longitudinal gaps in the plurality of shrouds such that combustion products and a portion of the first fluid in the plurality of coaxial flows pass through the shroud longitudinal gaps and the first fluid portion reacts with adjacent shrouds.

13. The method of claim 12, wherein the step of forming longitudinal gaps in the plurality of shrouds further comprises a step of directing the second fluid through a plurality of discontinuous annular/conical passages.

14. The method of claim 11, further comprising steps of:

cooling a combustion chamber side of the injector faceplate through transpiration of another portion of the second fluid through the injector faceplate; and forming longitudinal gaps in the plurality of shrouds such that combustion products and a portion of the first fluid in the plurality of coaxial flows pass through the shroud longitudinal gaps and the first fluid portion reacts with the another portion of the second fluid after the another portion of the second fluid transpires through the injector faceplate.

15. The method of claim 14, wherein the step of forming longitudinal gaps in the plurality of shrouds further comprises a step of directing the second fluid through a plurality of discontinuous annular/conical passages.

16. A method of combusting first and second propellant fluids comprising the steps of:

preheating the first or the second propellant fluid to at least 500 degrees Fahrenheit;

providing an injector comprising:

a porous faceplate disposed between a combustion chamber and a second propellant fluid plenum;

an oxidizer tube array structure with oxidizer passages that extend from a first propellant fluid manifold, through the second propellant fluid plenum, through the porous face plate, and into the combustion chamber; and a plurality of annular/conical passages extending through the porous faceplate and about the oxidizer passages, the annular/conical passage being arranged such that a flow of the second propellant fluid from the second fluid plenum and through the annular/conical passages is directed radially inward and impinges on a flow of the first propellent fluid from the first propellant fluid manifold a distance after the first propellant fluid flows have exited the first fluid passages and after the second propellant fluid flows have exited the annular/conical passages; and directing the first propellant fluid into the first propellant fluid manifold and directing the second propellant fluid into the second propellant fluid plenum, wherein a portion of the second propellant fluid transpires from the second propellant fluid plenum and through the porous faceplate.

17. The method of claim 16, wherein:

the oxidizer passages comprise oxidizer tubes that are integrally formed with the oxidizer tube array structure; and the porous face plate has receiving apertures into which the oxidizer tubes are secured.

18. The method of claim 16, wherein the preheating step comprises preheating the first or second propellant to at least 1000 degrees Fahrenheit.

19. The method of claim 16, wherein the preheating step comprises preheating the first or second propellant to at least 1300 degrees Fahrenheit.

* * * * *